W. W. Harvey,
Pruning Implement,
№ 14,097.              Patented Jan. 15, 1856.
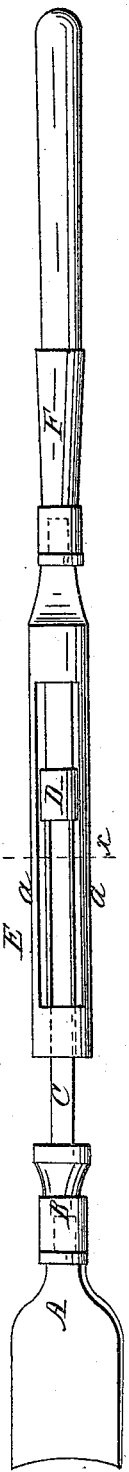

UNITED STATES PATENT OFFICE.

W. W. HARVEY, OF SALTVILLE, VIRGINIA.

IMPLEMENT FOR PRUNING TREES.

Specification of Letters Patent No. 14,097, dated January 15, 1856.

*To all whom it may concern:*

Be it known that I, W. W. HARVEY, of Saltville, in the county of Washington and State of Virginia, have invented a new and Improved Implement for Pruning Trees; and I do hereby declare that the following is a full, clear, and exact description of the same, reference being had to the annexed drawings, making a part of this specification, in which—

Figure 1, is a side view of my improvement. Fig. 2, is a transverse section of ditto, (*x*) (*x*) Fig. 1, showing the plane of section.

Similar letters of reference indicate corresponding parts in the two figures.

My invention consists in attaching the cutter or chisel to a shank which is fitted within a handle in such a manner that the handle is allowed to work or slide thereon and serve as a beater to act upon the cutter or chisel as will be presently shown and described.

To enable those skilled in the art to fully understand and construct my invention, I will proceed to describe it.

A, represents the cutter or chisel which is screwed into a collar or shoulder B, attached to a bar C, which bar forms the shank of the cutter or chisel. The bar or shank C, has a hub or boss D, attached to its outer or lower end and this hub or boss is fitted between ways or guides (*a*) (*a*) in a socket E, the bar or shank passing through the outer end of the socket, and the socket being of sufficient length to allow the hub or boss D, a requisite length of stroke or play. The inner or lower end of the socket E, is screwed into a handle F, which may be of any desired length and weight.

The implement is used as follows, the cutter or chisel by shoving the handle F, is forced a sufficient distance into the limb of the tree to be cut off so that it will be held in the cut, and the handle F, and socket E, is then drawn backward and the upper end of the socket E, is forced against the collar B, which blow will of course drive the cutter or knife still further into the limb. This operation is repeated until the limb is severed from the tree. Different sized chisels or cutters may be used, also handles of different sizes with the same socket and shank. The size and weight of the handle should correspond with the size of the cutter or chisel in order that the cutter or chisel may be acted upon with sufficient force.

The above implement is extremely simple and operates well in practice. It answers admirably well for pruning large limbs or those which are too thick to be cut off at a single blow or cut, besides the limbs are severed with a smooth clean cut, and are not hacked and the bark torn as is the case with the usual implements as the cutters or chisels are not always driven or forced in the same cut.

In some cases a hooked cutter may be preferred especially for cutting small limbs, in this case the action is reversed the handle being drawn quickly toward the operator to give the blow, the upper end of the socket striking against the hub or boss D.

Having thus described my invention, what I claim as new and desire to secure by Letters Patent, is—

Having the shank or bar C, of the cutter or chisel A, fitted within a socket E, attached to a proper handle F, the socket being allowed to slide or work on the shank or bar, substantially as shown for the purpose specified.

W. W. HARVEY.

Witnesses:
 SOLON BUCHANAN,
 RANDOLPH BUCHANAN.